250/201

United States Patent [19]

Matsumura

[11] Patent Number: 4,636,627
[45] Date of Patent: Jan. 13, 1987

[54] FOCUS DETECTING APPARATUS

[75] Inventor: Susumu Matsumura, Yokohama, Japan

[73] Assignee: Canon Kabushiki Kaisha, Tokyo, Japan

[21] Appl. No.: 569,994

[22] Filed: Jan. 11, 1984

[30] Foreign Application Priority Data

Jan. 17, 1983 [JP] Japan .................... 58-5630
Jan. 17, 1983 [JP] Japan .................... 58-5632
Apr. 21, 1983 [JP] Japan .................... 58-70565

[51] Int. Cl.⁴ ............................. G01J 1/20
[52] U.S. Cl. ....................... 250/201; 354/407
[58] Field of Search .......... 250/201, 204, 225, 226; 354/403, 406, 407, 408

[56] References Cited

U.S. PATENT DOCUMENTS

| | | | |
|---|---|---|---|
| 3,173,347 | 3/1965 | Stimson | 354/424 |
| 3,875,401 | 4/1975 | Stauffer | 250/225 |
| 4,415,245 | 11/1983 | Harvey | 354/403 |

Primary Examiner—David C. Nelms
Assistant Examiner—James G. Gatto
Attorney, Agent, or Firm—Fitzpatrick, Cella, Harper & Scinto

[57] ABSTRACT

In a focus detecting apparatus wherein an imaging optical system is disposed rearwardly of the predetermined imaging plane of an objective lens to thereby form a plurality of object images on the basis of lights passed through different portions of the pupil of the objective lens and each of the object images is detected by a line sensor comprising a plurality of photoelectric conversion elements to thereby detect the focus condition of the objective lens from the amount of deviation of each object image, a field limitation plate having a plurality of openings and an optical filter for causing the characteristics of the light passed through the openings of the field limitation plate to differ from one another are provided near the predetermined imaging plane of the objective lens. Thus, the apparatus is adaptable for different focus detection conditions and is very simple in construction.

9 Claims, 11 Drawing Figures

FOCUS DETECTING APPARATUS

BACKGROUND OF THE INVENTION

1. Field of the Invention

This invention relates to a so-called TTL type focus detecting apparatus which accomplishes in-focus detection by the use of an imaging light flux from a photo-taking lens, for example, in a single lens reflex camera.

2. Description of the Prior Art

The assignee of the present invention has proposed, in Japanese Patent Application No. 150520/1982 filed on Aug. 30, 1982, etc., various novel constructions of a focus detecting apparatus in which an imaging optical system is disposed rearwardly of the predetermined imaging plane of an objective lens to thereby form a plurality of object images on the basis of lights passed through different portions of the pupil of the objective lens and each of the object images is detected by a line sensor comprising a plurality of photoelectric conversion elements to thereby detect the focus condition of the objective lens from the amount of deviation of each object image.

Such a focus detecting apparatus effects focus detection only on the basis of the reflected natural ray from an object which is the focus target and is therefore called the passive type. In the focus detecting apparatus of such passive type, when the object brightness is sufficiently high, the apparatus performs well, but when the object brightness becomes lower than a certain value, the quantity of light entering the sensor is insufficient and thus, the operation of the apparatus becomes unstable. For this reason, in cameras having such apparatus, there is known a method of providing an auxiliary light source on the camera body, which auxiliary light source emits light and illuminates the object to be photographed when the object brightness is lower than a limit value, thereby yielding sufficient object brightness to such apparatus. However, where visible ray is utilized as the auxiliary light, there occurs no problem, whereas where infrared ray is utilized as the auxiliary light, there is a great problem. That is, it is difficult to realize a practical focusing optical system which will make compatible the focusing optical system using natural ray for a bright object to be photographed and the focusing optical system using infrared ray for a dark object to be photographed.

Generally, in the photo-taking lens of a camera, there is a difference between the focus position for visible ray and the focus position for infrared ray and well-focused photographs cannot be taken unless in-focus detection is effected with visible ray and infrared ray distinguished from each other. As the focus detecting apparatus which effects in-focus detection with visible ray and infrared ray distinguished from each other in this manner, there are known two types, i.e., the type in which two kinds of optical system for visible ray and infrared ray are prepared and the type in which an infrared cut filter is put into and out of a focusing optical system to thereby realize in-focus detection for two kinds of light. In the former method, two kinds of optical system must be prepared and in the latter method, a mechanism for putting the infrared cut filter into and out of the focusing optical system is necessary. None of these two methods may be said to be practical.

Also, where the aforedescribed focus detecting apparatus is applied to an optical instrument such as a single lens reflex camera in which photo-taking lenses having different brightnesses (F No.) are selectively mounted, it is known that if the passage range of the imaging light flux directed to the sensor is set to the outer peripheral portion of the pupil of a light (small in F No.) photo-taking lens in order to increase the amount of deviation of each image corresponding to the focus condition of the photo-taking lens to thereby enhance the focus detection accuracy, when a dark (great in F No.) photo-taking lens is mounted in such camera, part of the imaging light flux directed to the sensor is eclipsed andd the focus detection accuracy during the use of the dark lens is remarkably reduced. For this reason, in such a focus detecting apparatus according to the prior art, two imaging lenses for forming an image on the basis of the light flux from the center of the pupil of the photo-taking lens and two imaging lenses for forming an image on the basis of the light flux from the outer peripheral portion of the pupil of the photo-taking lens are provided rearwardly of the predetermined imaging plane of the photo-taking lens, whereby the image used for focus detection is changed over in conformity with the brightness of the photo-taking lens. Also, in the aforementioned patent application of the assignee of the present invention, it is proposed to provide an imaging lens, a wedge-prism for dividing the imaging light flux from the center of the pupil of the photo-taking lens and a wedge-prism for dividing the imaging light flux from the outer peripheral portion of the pupil of the photo-taking lens, instead of providing four imaging lenses, thereby enabling the formation of an image corresponding to the brightness of each photo-taking lens.

However, where such a focus detecting apparatus is incorporated in a small optical instrument such as a camera, it becomes necessary to shorten the distance from the predetermined imaging plane of the photo-taking lens to the sensor as much as possible. Therefore, for example, where a wedge-prism is employed, the vertical angle of the wedge thereof must be made great in order that the images based on the light fluxes divided by the wedge-prism may not overlap each other. For this reason, in such an apparatus, the optical aberration of the focusing optical system becomes great and this leads to an unsatisfactory image formed on the sensor. This in turn leads to reduced focus detection accuracy. A similar problem will also occur in the former method in which a plurality of imaging lenses are provided.

SUMMARY OF THE INVENTION

The present invention has been made in view of the above-noted situation and an object thereof is to provide a focus detecting apparatus which can accomplish highly accurate focus detection in conformity with different focus detection conditions and eliminates the above-noted inconveniences.

Another object of the present invention is to provide a focus detecting apparatus capable of accomplishing focus detection based on both visible ray and infrared ray with a very simple construction.

Still another object of the present invention is to provide a focus detecting apparatus capable of accomplishing focus detection by a very simple construction even when objective lenses of different brightnesses are used.

Other objects of the present invention will become apparent from the following detailed description of some embodiments thereof taken in conjunction with the accompanying drawings.

DESCRIPTION OF THE PREFERRED EMBODIMENTS

Figure 1:
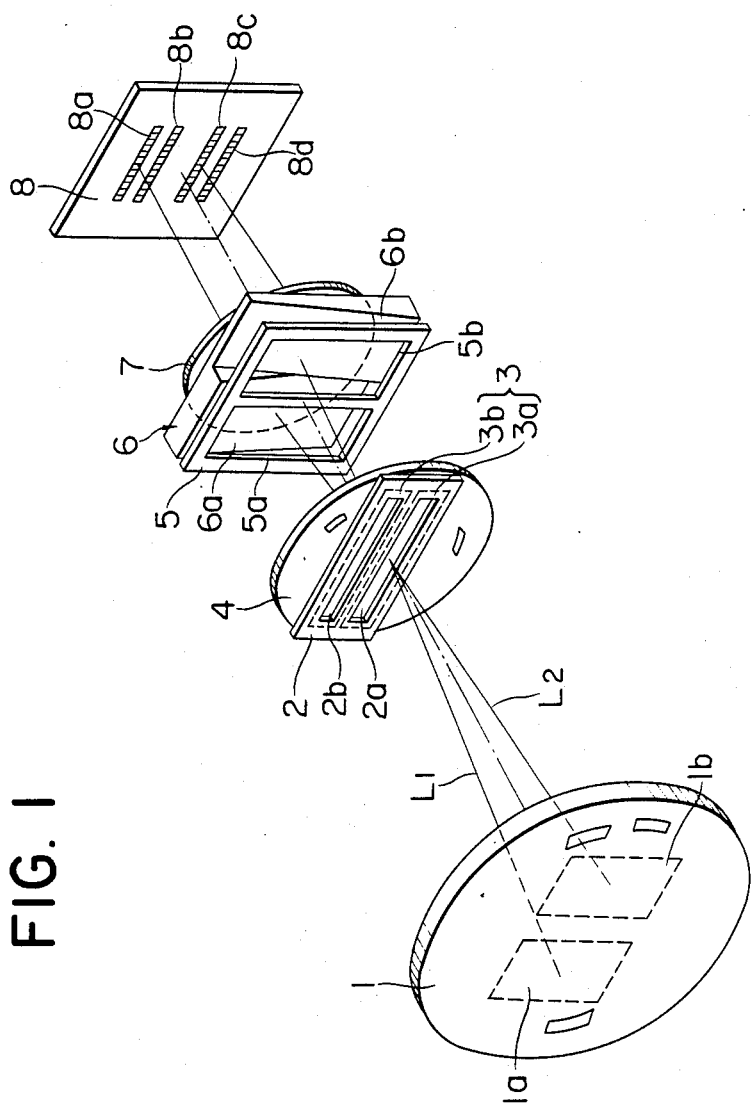
FIG. 1 is a perspective view showing a first embodiment of the focus detecting apparatus of the present invention.

The present invention will hereinafter be described with respect to embodiments thereof, and description will first be made of an embodiment which enables focus detection based on both visible ray and infrared ray by using the present invention. It is to be understood that the following description is made on the supposition that each embodiment is incorporated in a single lens reflex camera. Also, in the various embodiments, functionally similar members are given similar reference characters and some of the description thereof will be omitted.

In the embodiment of FIG. 1, there is provided a light shielding member 2 near the predetermined imaging plane (a plane equivalent to the surface of the film in the cemara) of a photo-taking lens 1, an optical filter 3, a field lens 4, a diaphragm frame 5, a pupil divider 6, a secondary imaging lens 7 and a sensor base plate 8, arranged in succession along the course of a light flux emerging from the photo-taking lens 1. Two rectangular field apertures 2a and 2b having their longer sides arranged horizontally as viewed in the Figure are provided vertically in the light shielding member 2. An optical filter 3a having a spectral transmission factor characteristic which transmits therethrough only visible ray and intercepts infrared ray is provided rearwardly of and proximate to the field aperture 2a, and an optical filter 3b having a characteristic which transmits therethrough only infrared ray and intercepts visible ray is disposed rearwardly of and proximate to the field aperture 2b. Two rectangular diaphragm frames 5a and 5b are provided in the diaphragm frame 5, and wedge-prisms 6a and 6b different in angle of inclination from each other and constituting the pupil divider 6 are disposed rearwardly of the diaphragm frames 5a and 5b. Two sets of two line sensors 8a, 8b and 8c, 8d are arranged on the sensor base plate 8, these two sets being parallel to the field apertures 2a and 2b. Each of the line sensors is formed by a plurality of photoelectric conversion elements and may be, for example, a CCD or the like.

Light rays L1 and L2 from an object to be photographed pass through the different pupils 1a and 1b of the photo-taking lens 1 and are imaged at a point in the field aperture 2a. Due to the action of the optical filter 3a, only the visible ray arrives at the field lens 4, and the field lens 4 images the pupils of the photo-taking lens 1 near the pupil divider 6. Accordingly, the light ray L1 coming from one pupil 1a of the photo-taking lens 1 passes through the diaphgram frame 5a into the wedge-prism 6a and is deflected upwardly there, whereupon it is imaged on the line sensor 8a by the secondary imaging lens 7. Likewise, the light ray L2 from the other pupil 1b of the photo-taking lens 1 is deflected downwardly by the wedge-prism 6b, whereupon it is imaged on the line sensor 8c by the secondary imaging lens 7. The secondary imaging lens 7 is set so as to cause the object image formed in the field aperture 2a to be imaged on the line sensors 8a and 8c of the sensor base plate 8 and cause the image of the field aperture 2b to be imaged on the line sensors 8b and 8d. In this manner, the imaging light flux passing through á field aperture is imaged as two vertically spaced images on the sensor base plate 8 depending on the positions of the pupils of the photo-taking lens 1. Accordingly, if the vertical angles of the wedge-prisms 6a and 6b and the spacing between the field apertures 2a and 2b are designed such that the images of the two field apertures 2a and 2b do not overlap each other, a total of four object images will be formed while being vertically juxtaposed on the sensor base plate 8. The visible ray image formed on the field aperture 2a by the photo-taking lens 1 is reimaged on the line sensors 8a and 8c by the field lens 4, the pupil divider 6 and the secondary imaging lens 7 and therefore, if the output signals from the line sensors 8a and 8c are supplied to a well-known in-focus judgment electrical processing system, detection of the in-focus with respect to the visible ray image can be accomplished by finding the amounts of derivation of the images on the respective line sensors 8a and 8c.

On the other hand, where the in-focus detection using infrared ray as auxiliary light is to be effected, the infrared ray image within the field aperture 2b is re-imaged on the line sensors 8b and 8d by the optical filter 3b provided just rearwardly of the field aperture 2b which intercepts visible ray and transmits infrared ray therethrough. Accordingly, if the output signals from the line sensors 8b and 8d are supplied to the in-focus judgment electrical processing system, detection of the in-focus with respect to the infrared ray image will become possible.

In this manner, in the present embodiment, when the object brightness is sufficiently high, the output signals from the line sensors 8a and 8c may be provided to the in-focus judgment electrical processing system and, when the object brightness is not sufficient and the object to be photographed is illuminated with infrared ray as auxiliary light, the output signals from the line sensors 8b and 8d may be provided to the in-focus judgment electrical processing system.

Figure 2:
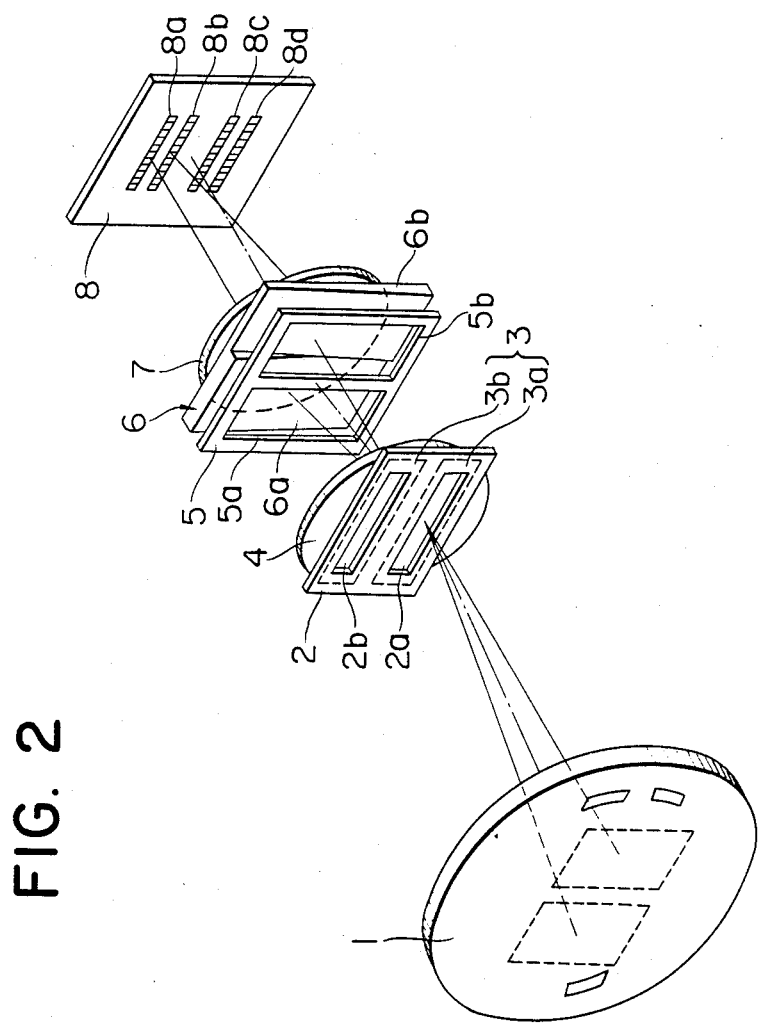
FIG. 2 is a perspective view showing a second embodiment of the present invention.

FIG. 2 shows a second embodiment of the present invention, which differs from the aforedescribed first embodiment in that the spacing between the two field apertures 2a and 2b is wider and the wedge angle of the wedge-prisms 6a and 6b of the pupil divider 6 is smaller. In this embodiment, the image of the field aperture 2a is imaged on the line sensors 8a and 8b by the secondary imaging lens 7 and the image of the field aperture 2b is likewise imaged on the line sensors 8c and 8d. Thus, the visible ray image is input as an electrical signal to the in-focus judgment electrical processing system by the line sensors 8a and 8b and the infrared ray image is supplied to the processing system through the line sensors 8c and 8d, whereby respective in-focus detections are effected.

This embodiment, as compared with the first embodiment, has the disadvantage that in-focus detection is carried out in different portions of the object to be photographed during the in-focus judgment with visible ray and infrared ray correspondingly to the wider spacing between the field apertures 2a and 2b, while it has the advantage that deterioration of the re-imaged image is small because the angle of the wedge-prisms 6a and 6b of the pupil divider 6 is smaller and thus the aberrations resulting from these prisms 6a and 6b are smaller.

Figure 3:
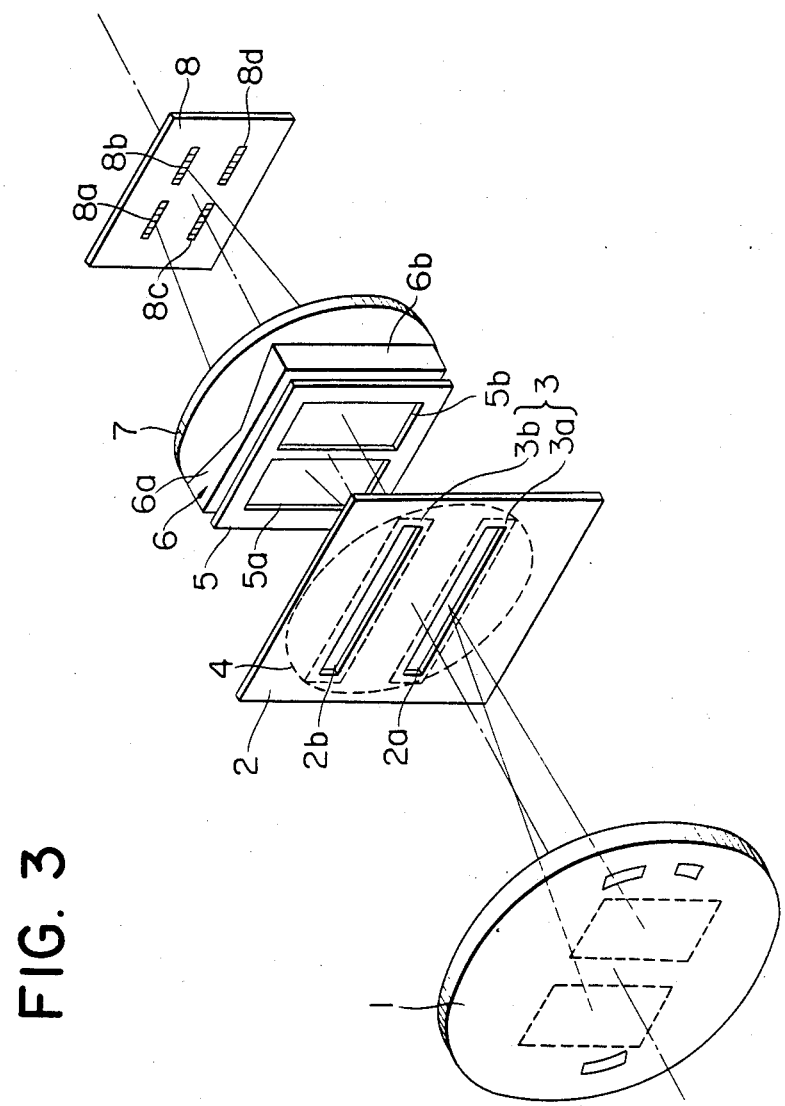
FIG. 3 is a perspective view showing a third embodiment of the present invention.

FIG. 3 shows a third embodiment of the present invention. This embodiment differs from the above-described first and second embodiments in that the direction of inclination of the wedge-prisms 6a and 6b of the pupil divider 6 differs (that is, in the previous embodiments, the direction of inclination of the light flux is vertical, whereas in this embodiment, it is horizontal) and that the arrangement of the line sensors 8a–8d on the sensor base plate 8 differs. In the present embodiment, the direction of the wedge of the prisms 6a and 6b of the pupil divider 6 differs from that shown in FIGS. 1 and 2 and therefore, the manner in which the images of the field apertures 2a and 2b formed on the sensor base plate 8 are arranged differs. In FIG. 3, the line sensors 8a and 8b detect the visible ray image and the line sensors 8c and 8d detect the infrared ray image and thus, the embodiment of FIG. 3 is functionally similar to the first and second embodiments.

Figure 4:
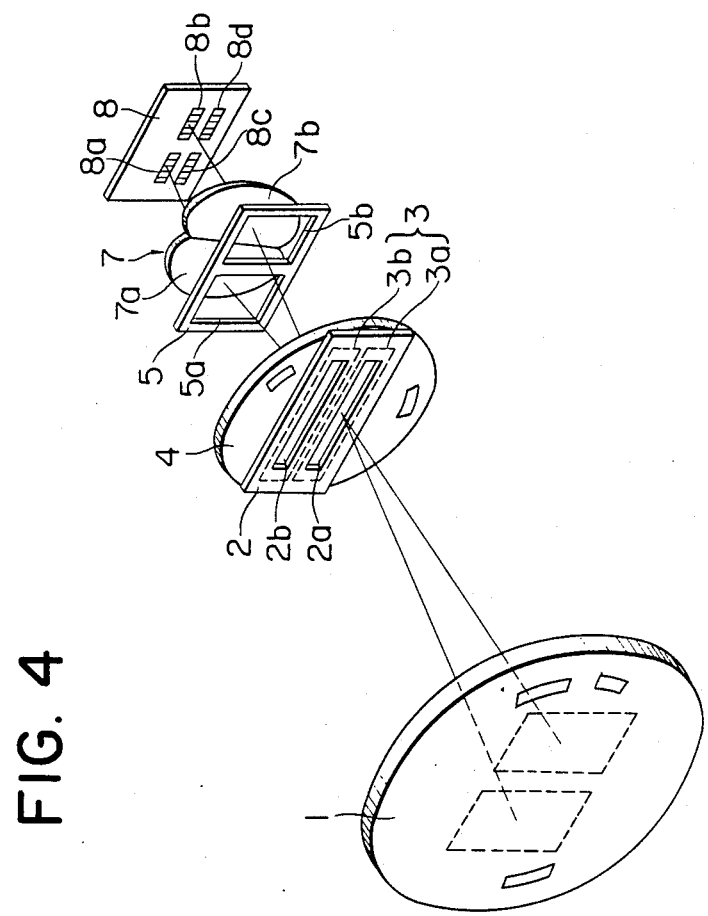
FIG. 4 is a perspective view showing a fourth embodiment of the present invention.

A fourth embodiment shown in FIG. 4 realizes a function similar to that of the third embodiment by changing the construction of the secondary imaging optical system. In this embodiment, the pupil divider 6 comprising wedge-prisms 6a and 6b is eliminated and the secondary imaging lens 7 is comprised of a pair of imaging lenses 7a and 7b having a vertical straight boundary portion therebetween which also serves as pupil dividing means.

Figure 5:
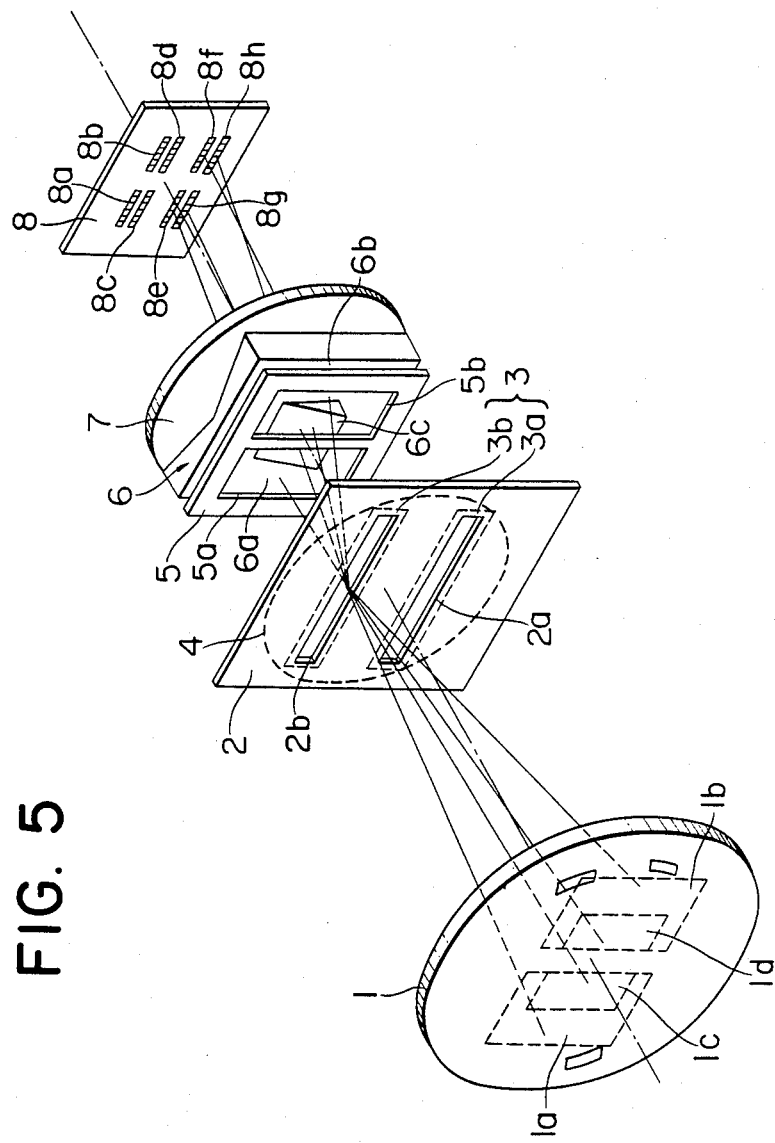
FIG. 5 is a perspective view showing a fifth embodiment of the present invention.

FIG. 5 illustrates a fifth embodiment and shows a case where the present invention is applied to an automatic in-focus detecting optical system effectively operable for a photo-taking lens 1 having a wide range of F-number. This embodiment is based on the construction of FIG. 3, but the pupil divider 6 has, in addition to the wedge-prisms 6a and 6b, a wedge-prism 6c for dividing the pupil of the photo-taking lens 1 into pupils 1a, 1b for a lens of light F-number and pupils 1c, 1d for a lens of dark F-number. Therefore, the imaging light flux passing through one of the field apertures 2a and 2b is divided into four object images on the sensor base plate 8. Accordingly, a total of eight images is obtained for the two field apertures 2a and 2b and line sensors 8a–8h are arranged correspondingly to the respective images. In the present embodiment, the line sensors 8a–8h are used properly as shown in the table below.

| Kinds of image | F-number of photo-taking lens | Line sensors used |
| --- | --- | --- |
| visible ray | light | 8a, 8b |
| visible ray | dark | 8c, 8d |
| infrared ray | light | 8e, 8f |
| infrared ray | dark | 8g, 8h |

In each of these cases, the amount of lateral deviation of the image can be found on the basis of the output signals from each pair of line sensors and in-focus judgment can be effected.

As previously described, in the ordinary photo-taking lens, the focus position for a visible ray and the focus position for an infrared ray differ from each other. In order that the in-focus detecting apparatus of the present invention may be operated more effectively for strobe photography or the like, the camera body side can be caused to effect such a control that for each lens, the amount of difference between the focus position for a visible ray and the focus position for an infrared ray is provided in the form of a length of signal pin provided on the interchangeable photo-taking lens side or in the form of the electronic storage, such as a semiconductor memory or the like. This amount is read from the camera body side, the in-focus in infrared ray is confirmed. The photo-taking lens 1 then is moved by an amount corresponding to the amount read, the photo-taking lens is positioned at a predetermined in-focus position for a visible ray and then strobe light is emitted to take a picture.

In each of the above-described embodiments, the optical filter 3 may be disposed near the light shielding member 2 and need not always be disposed just rearwardly of the light shielding member.

A description will now be made of another embodiment of the present invention in which the arrangement of the optical filter 3 differs from that in each of the aforedescribed embodiments.

Figure 6:
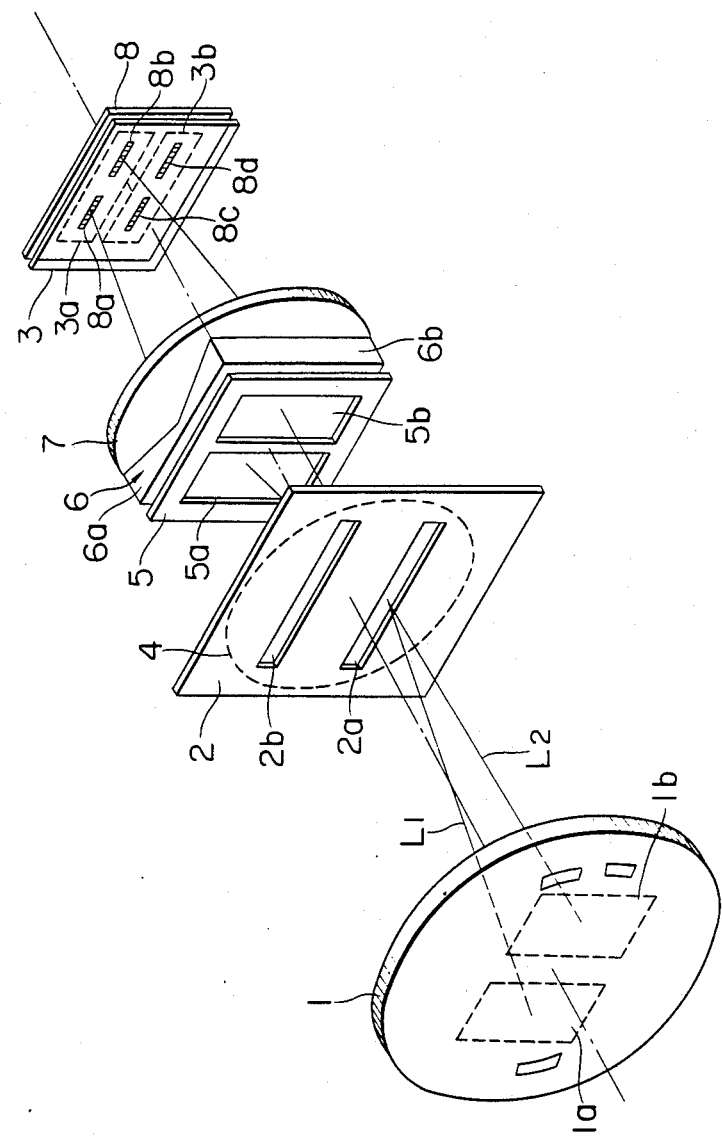
FIG. 6 is a perspective view showing a sixth embodiment of the present invention.

The embodiment of FIG. 6 is a modification of the embodiment of FIG. 3. This embodiment differs from the embodiment of FIG. 3 in that the optical filter 3 is disposed just forwardly of the sensor base plate 8 instead of being disposed just rearwardly of the light shielding member 2. In the other points, this embodiment is similar to the embodiment of FIG. 3. In this embodiment, the optical filter 3 disposed just forwardly of the sensor base plate 8 comprises an optically transparent member coated with first and second dielectric multi-layer films 3a and 3b. The first dielectric multi-layer film 3a which transmits visible ray therethrough and reflects infrared ray is disposed just forwardly of a first set of line sensors 8a and 8b, and the second dielectric multi-layer film 3b which reflects visible ray and transmits infrared ray therethrough is disposed just forwardly of a second set of line sensors 8c and 8d.

Light rays L1 and L2 from the object to be photographed passed through the different pupils 1a and 1b of the photo-taking lens 1 and are imaged at a point in the field aperture 2a and thereafter arrive at the field lens 4, which images the pupils of the photo-taking lens 1 near the pupil divider 6. Accordingly, the light ray L1 from one pupil 1a of the photo-taking lens 1 passes through the diaphragm frame 5a into the wedge-prism 6a, and is deflected there leftwardly and imaged on the line sensor 8a by the secondary imaging lens 7. Likewise, the light ray L2 from the other pupil 1b of the photo-taking lens 1 is deflected rightwardly by the wedge-prism 6b and imaged on the line sensor 8b. The secondary imaging lens 6 is set so as to cause the images in the field apertures 2a and 2b to be imaged on the line sensors 8a, 8b and 8c, 8d, respectively, of the sensor base plate 8. In this manner, the image of one of the field apertures 2a and 2b is imaged as two horizontally spaced apart images on the sensor base plate 8 depending on the pupil position of the photo-taking lens 1. Accordingly, if the vertical angles of the wedge prisms 6a and 6b and the spacing between the field apertures 2a and 2b are designed such that the images in the two field apertures 2a and 2b do not overlap each other, a total of four object images will be formed while being arranged vertically and horizontally on the sensor base plate 8. The image formed on the field aperture 2a by the photo-taking lens 1 is re-imaged on the line sensors 8a and 8b by the field lens 4, the pupil divider 6 and the secondary imaging lens 7. Since the first dielectric multi-layer film 3a which intercepts infrared ray and transmits visible ray therethrough is dispersed just forwardly of the line sensors 8a and 8b, the visible ray object image is re-imaged on these line sensors 8a and 8b, and the output signals thereof corresponding to the distribution of quantity of light are supplied to the in-focus judgment electrical processing system and the amounts of deviation of the images on the respective line sensors 8a and 8b are found, whereby detection of the in-focus with respect to the visible ray image can be carried out.

On the other hand, where the in-focus detection using infrared auxiliary light is to be effected, as regards the photo image information travelling toward the line sensors 8c and 8d via the field aperture 2b, only the infrared ray is transmitted through the second dielectric multi-layer film 3b and the infrared ray image in the field aperture 2b is re-imaged. Accordingly, if the output signals from the line sensors 8c and 8d are supplied to the in-focus judgment electrical processing system, detection of the state with respect to the infrared ray image will become possible similarly to the embodiment of FIG. 3.

Figure 7:
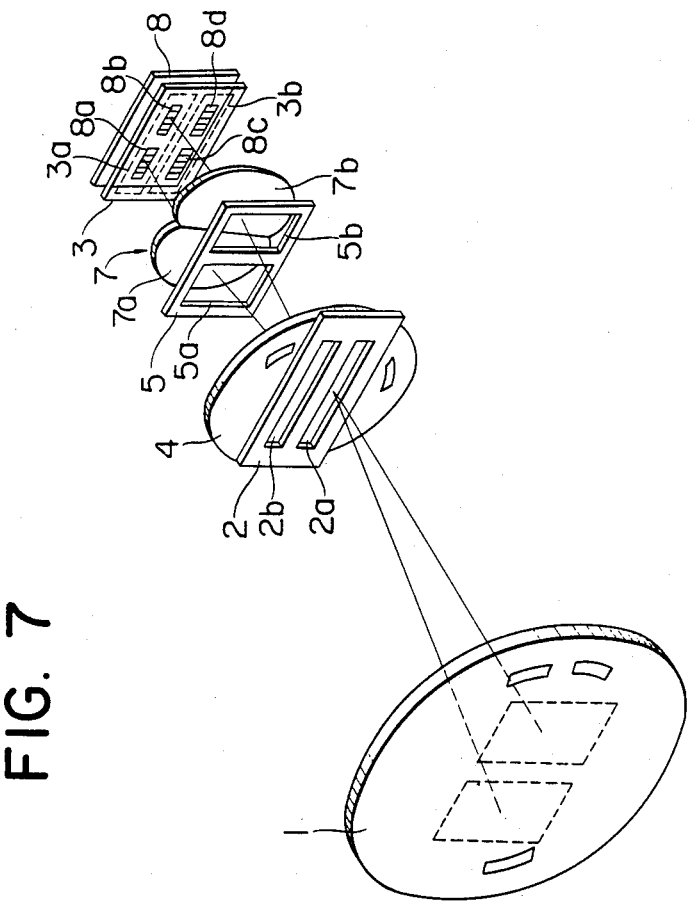
FIG. 7 is a perspective view sowing a seventh embodiment of the present invention.

A seventh embodiment shown in FIG. 7 realizes a function similar to that of the embodiment of FIG. 6 by changing the constructions of the pupil divider 6 and the secondary imaging lens 7. In this embodiment, the pupil divider 6 comprising wedge-prisms 6a and 6b is eliminated and the secondary imaging lens 7 is comprised of a pair of imaging lenses 7a and 7b having a straight boundary portion therebetween, which serves also as pupil dividing means. This embodiment differs from the embodiment of FIG. 4 in that the optical filter 3 is positioned just forwardly of the sensor base plate 8.

Figure 8:
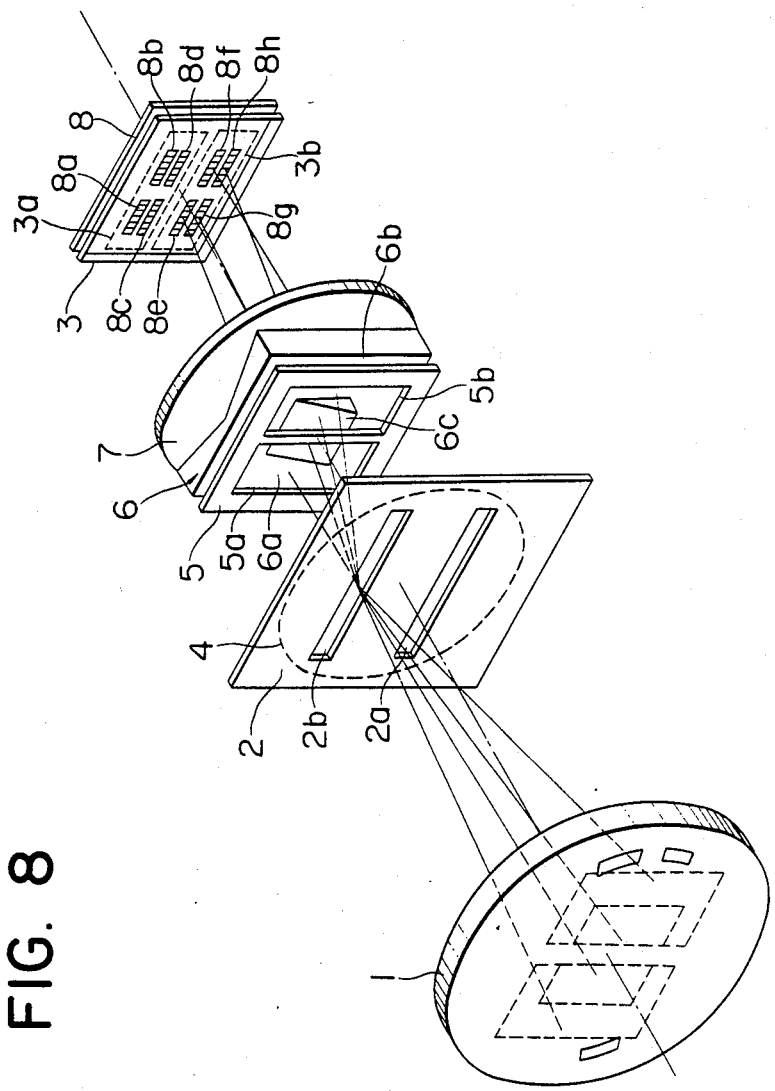
FIG. 8 is a perspective view showing an eighth embodiment of the present invention.

The embodiment of FIG. 8 is a modification of the embodiment of FIG. 5. This embodiment differs from the previous embodiment in that the optical filter 3 is disposed just forwardly of the sensor base plate 8 so that a first dielectric multi-layer film 3a which transmits visible ray therethrough is positioned just forwardly of the line sensors 8a–8d and a second dielectric multi-layer film 3b which transmits infrared ray therethrough is positioned just forwardly of the line sensors 8c–8h. The F-number of the photo-taking lens and the change of pairs of sensors used corresponding to the variation in visible and infrared rays are similar to those in the embodiment of FIG. 5.

In each of the aforedescribed embodiments, the field aperture 2a for visible light and the field aperture 2b for infrared ray are vertically slightly spaced apart from each other and therefore, in the case of visible ray and the case of infrared ray, detection of in-focus cannot be accomplished strictly with respect to the same portion of the object to be photographed, whereas there will occur no practical problem if the spacing between these field apertures is made small.

A description will now be made of another embodiment of the present invention, which can accomplish focus detection even when a photo-taking lens of different brightness (F-number) is mounted and in which occurrence of aberrations of the focus detecting optical system is prevented.

Figure 9:
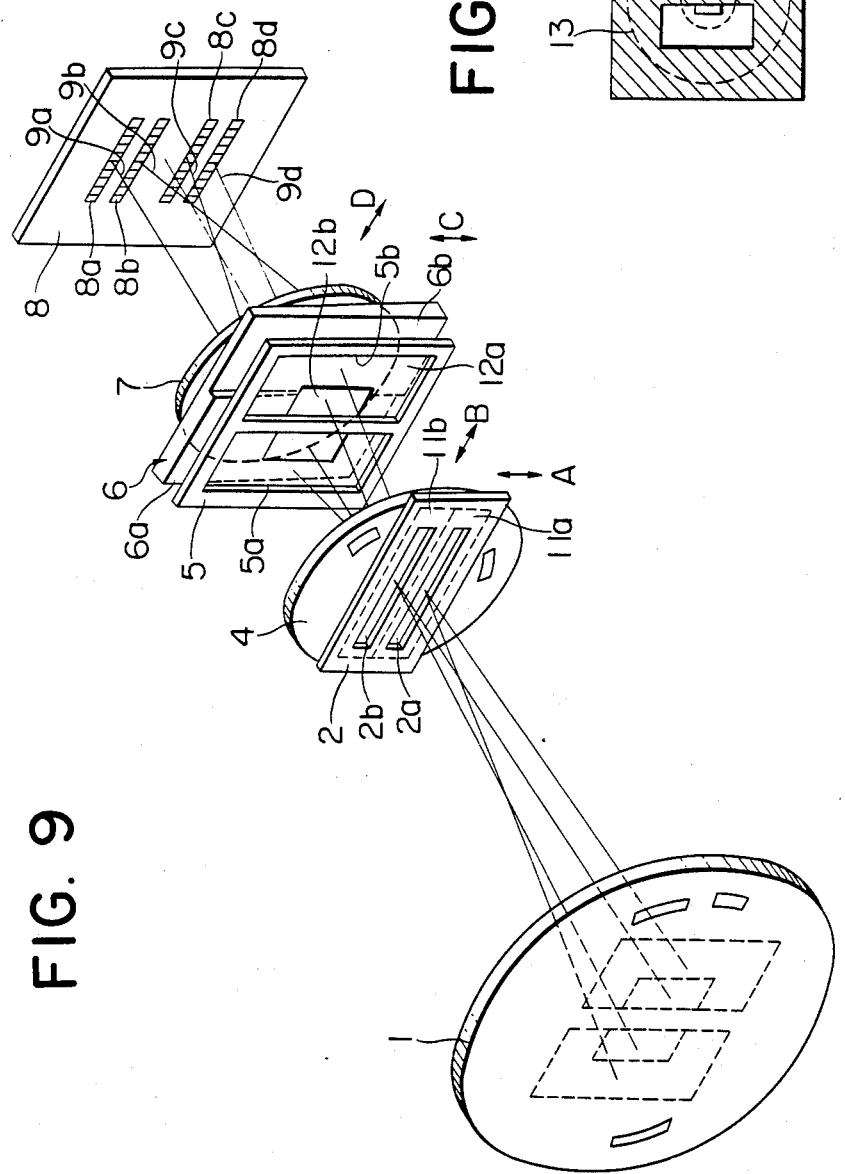
FIG. 9 is a perspective view showing a ninth embodiment of the present invention.

In FIG. 9, a light shielding member 2 having two juxtaposed slit-like field apertures 2a and 2b is provided near the predetermined imaging plane of the photo-taking lens 1, and a field lens 4 is disposed just rearwardly of the light shielding member 2. An opening frame 5 having openings 5a and 5b, a light divider 6 and a secondary imaging lens 7 are disposed in succession rearwardly of the field lens 4, and line sensors 8a, 8b, 8c and 8d each comprising a plurality of photoelectric conversion elements are disposed on a sensor base plate 8 which in turn is disposed on the secondary imaging plane of the secondary imaging lens. Light flux from the photo-taking lens 1 passed that is through the two field apertures 2a and 2b is re-imaged on the sensor base plate 8 by the secondary imaging lens 7, and a first polarizing plate 11a having a polarization axis in the direction of bidirectional arrow A (the vertical direction in the figure) is disposed on the back of the field aperture 2a. A second polarizing plate 11b having a polarization axis in the direction of bidirectional arrow B orthogonal to the arrow A (the horizontal direction in the figure) is provided on the back of the field aperture 2b. A polarizing plate 12a having a polarization axis in the direction of bidirectional arrow C is provided around the outer periphery of the opening frame 5, and a polarizing plate 12b having a polarization axis in the direction of bidirectional arrow D is provided centrally of the opening frame 5. Arrows A and C are parallel to each other and arrows B and D are parallel to each other.

Accordingly, the light flux passed through the first field aperture 2a and thus through the polarizing plate 11a cannot be transmitted through the central portion of the opening frame 5 in which is provided the polarizing plate 12b different in the direction of polarization, but only the light flux passed through the outer peripheral portion of the opening frame is re-imaged on the sensor base plate 8 by the light divider 6 and the secondary imaging lens 7 and imaged on the elements 9a and 9b in the line sensors 8a and 8b. Likewise, the light flux passed through the second field aperture 2b and thus through the polarizing plate 11b cannot be transmitted through the outer peripheral portion of the opening frame 5 in which the polarizing plate 12a different in the direction of polarization, but only the light flux passed through the central portion of the opening frame 5 is re-imaged and imaged on the elements 9c and 9d in the line sensors 8c and 8d. Accordingly, the light flux passed through the first field aperture 2a passes only through the outer peripheral portion of the opening frame 5 and is imaged on the line sensors 8a and 8b, and the light flux passed through the second field aperture 2b passes only through the central portion of the opening frame 5 and is imaged on the line sensors 8c and 8d. The opening frame 5 is imaged at the pupil position of the photo-taking lens 1 by the field lens 4 and therefore, the central portion and outer peripheral portion of the opening frame 5 correspond to the inner area and outer area, respectively, of the pupil of the photo-taking lens 1, as shown. That is, of the images formed in the first field aperture 2a, the image by the light flux from the outside of the pupil of the photo-taking lens 1 is re-imaged on the line sensors 8a and 8b, and of the images formed in the second field aperture 2b, the image by the light flux from the inside of the pupil of the photo-taking lens 1 is re-imaged on the line sensors 8c and 8d.

Thus, in the present embodiment, when the photo-taking lens 1 is a light lens, the output signals from the line sensors 8a and 8b are used and the light flux passed through the outer portion of the exit pupil of the photo-taking lens 1 is utilized, whereby the accuracy of focus detection can be improved. Also, when the photo-taking lens 1 is a dark lens, if the output signals from the line sensors 8c and 8d are used, the focus detection using a light flux free of eclipse can be accomplished. Selection of the line sensors used can be readily accomplished either electrically or mechanically by disposing a shutter or the like in front of the line sensors, in accordance with the brightness of the photo-taking lens 1.

Also, in the present embodiment, the vertical angle of the wedge of the light divider 6 may be an angle sufficient to separate two images and therefore, as compared with the case where the four images as described above are obtained by combining four wedge-prisms, the optical aberration of the images formed on the sensor base plate 8 is small and good focusing accuracy can be obtained. Between the case where the line sensors 8a and 8b are used and the case where the line sensors 8c and 8d are used, the object with respect to which focus detection is to be effected differs more or less, but if the spacing between the first field aperture 2a and the second field aperture 2b shown in FIG. 9 is made small, there will occur no practical problem. Also, in the present embodiment, the polarizing plates 12a and 12b are provided on the back of the opening frame 5, but alternatively, these may be disposed on the front of the opening frame 5 or just rearwardly of the light divider 6.

Figure 10:
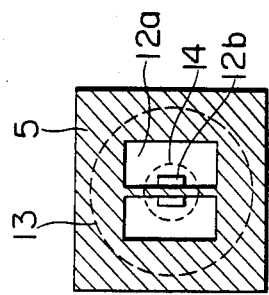
FIG. 10 is a plan view showing the essential portions of the ninth embodiment.

FIG. 10 shows the relation between the image of the pupil of the photo-taking lens 1 by the field lens 4 and the sizes of the areas of the opening frame 5 and two polarizing plates 12a, 12b. Reference numeral 13 designates the pupil diameter of a light photo-taking lens 1 and reference numeral 14 denotes the pupil diameter of a dark photo-taking lens 1. Where the photo-taking lens 1 is dark, the polarizing plate 12b is included in this pupil diameter, and there the photo-taking lens 1 is light, the polarizing plate 12a is also included in this pupil diameter. By adopting such a construction, it becomes possible to obtain a proper distribution of light corresponding to the distribution of the object brightness on the surface of each line sensor.

Figure 11:
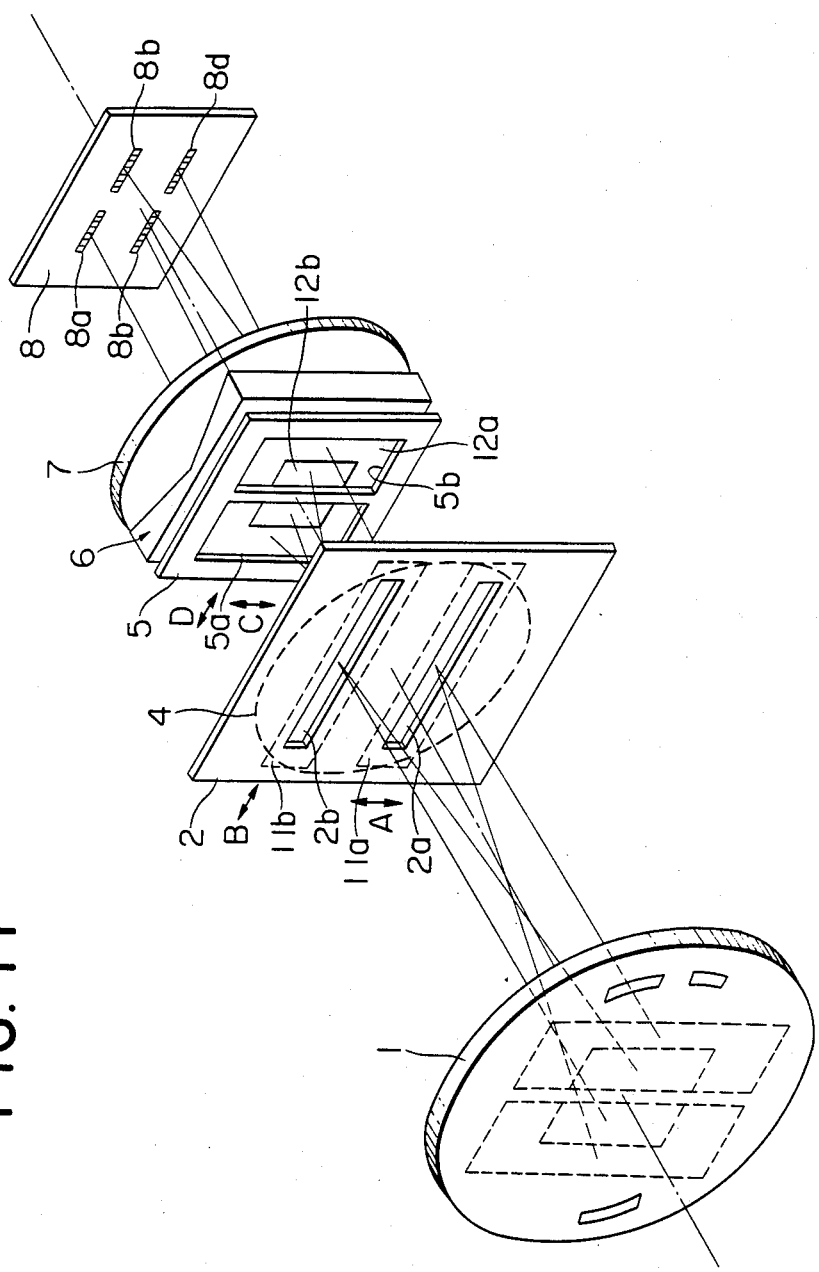
FIG. 11 is a perspective view showing a tenth embodiment of the present invention.

FIG. 11 shows still another embodiment of the present invention. The difference of this embodiment from the embodiment of FIG. 9 lies in the secondary imaging optical system, and particularly in the direction of the wedges of the prisms of the light divider 6. Correspondingly thereto, the manner in which the images on the sensor base plate 8 are arranged differs from that in the embodiment of FIG. 9 and thus, line sensors 8a, 8b, 8c and 8d are arranged vertically and horizontally correspondingly to the object image. Polarizing plates 11a and 11b having polarization axes orthogonal to each other are disposed just rearwardly of two field apertures 2a and 2b, and two polarizing plates 12a and 12b having the same polarization axes as those of the polarizing plates 11a and 11b are disposed near the light divider 6 correspondingly to the outer peripheral portion and central portion of the opening frame 5. In this respect, the present embodiment is just the same as the embodiment of FIG. 9 and, in FIG. 11, members identical or corresponding to those of FIG. 9 are given similar reference characters.

According to the present invention, as described above in detail, there can be provided an apparatus which can accomplish accurate focus detection even for different focus detection conditions and the construction thereof can be very much simplified.

What I claim is:

1. A focus detecting apparatus for detecting the focus condition of an objective lens, comprising:
    (a) light intercepting means having a plurality of openings such that a stream of light passes from said objective lens through each opening, said light intercepting means disposed near a predetermined imaging plane of said objective lens;
    (b) imaging means for forming a plurality of images on the basis of each of the light streams passing through the openings of said light intercepting means;
    (c) filter means for causing an optical characteristic of the light streams passing through the openings of said light intercepting means to differ from one another; and
    (d) sensing means for sensing the images formed by said imaging means.

2. An apparatus according to claim 1, wherein said filter means renders an image formed on the basis of a first light stream passing through a first of the openings of said light intercepting means into a visible light image and renders an image formed on the basis of a second light stream passing through a second of the openings into an infrared light image.

3. An apparatus according to claim 2, wherein said filter means has a first portion which transmits visible light therethrough and intercepts infrared light and a second portion which transmits infrared light therethrough and intercepts visible light.

4. An apparatus according to claim 3, wherein said filter means is disposed proximate to said light intercepting means.

5. An apparatus according to claim 3, wherein said filter means is disposed proximate to said sensing means.

6. An apparatus according to claim 3, wherein said filter means is disposed between said light intercepting means and said sensing means.

7. A focus detecting apparatus for detecting the focus condition of an objective lens, comprising:
    (a) light intercepting means having a plurality of openings such that a stream of light passes from said objective lens through each opening, said light intercepting means disposed near a predetermined imaging plane of said objective lens;
    (b) imaging means for forming a plurality of images on the basis of each of the light streams passing through the openings of said light intercepting means.
    (c) filter means for causing an optical characteristic of the light streams passing through the openings of said light intercepting means to differ from one another, said filter means having a plurality of polarizing portions having different polarization axes;
    (d) separating means for causing said imaging means to form an image on the basis of a first light stream passing through a first of the openings of said light intercepting means and an image on the basis of a second light stream passing through a second of the openings separately from each other, said separating means having a plurality of polarizing portions, the polarization axis of a first of said separating means polarizing portions being in the same direction as the polarization axis of a first of said filter means polarizing portions and the polarization axis of a second of said separating means polarizing portions being in the same direction as the polarization axis of a second of said filter means polarizing portions; and (e) sensing means for sensing the images formed by said imaging means.

8. An apparatus according to claim 7, wherein the polarizing portions of said separating means are provided so as to correspond to the central portion and outer peripheral portion of the pupil of said objective lens.

9. An apparatus according to claim 8, wherein said separating means is disposed proximate to said imaging means.

* * * * *